(12) United States Patent
Lee et al.

(10) Patent No.: US 9,694,705 B2
(45) Date of Patent: Jul. 4, 2017

(54) VEHICLE CHARGER AND METHOD FOR CONTROLLING POWER THEREOF

(71) Applicants: Hyundai Motor Company, Seoul (KR); Kia Motors Corporation, Seoul (KR)

(72) Inventors: Jae Won Lee, Gyeonggi-do (KR); Dong Jun Lee, Gyeonggi-do (KR); Young Kook Lee, Seoul (KR); Hun Kong, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 162 days.

(21) Appl. No.: 14/682,288

(22) Filed: Apr. 9, 2015

(65) Prior Publication Data

US 2016/0096441 A1    Apr. 7, 2016

(30) Foreign Application Priority Data

Oct. 2, 2014 (KR) .................. 10-2014-0133276

(51) Int. Cl.
*H02J 7/14* (2006.01)
*H02J 7/00* (2006.01)
*B60L 11/00* (2006.01)
*B60L 11/18* (2006.01)

(52) U.S. Cl.
CPC ....... *B60L 11/1838* (2013.01); *B60L 11/1816* (2013.01); *B60L 11/1861* (2013.01); *Y02T 10/7005* (2013.01)

(58) Field of Classification Search
CPC .................. B60L 11/1812; B60L 11/1838
USPC .................. 320/104, 109; 701/22
See application file for complete search history.

(56) References Cited

U.S. PATENT DOCUMENTS

| | | | |
|---|---|---|---|
| 8,301,322 B2 | 10/2012 | Mitsutani | |
| 8,749,198 B2 | 6/2014 | Klesyk | |
| 2010/0299008 A1 | 11/2010 | Mitsutani | |
| 2013/0320922 A1 | 12/2013 | Acena et al. | |
| 2014/0253018 A1* | 9/2014 | Kong ................. | B60L 11/1812 320/104 |

FOREIGN PATENT DOCUMENTS

| | | |
|---|---|---|
| JP | 2014-082849 A | 5/2014 |
| KR | 10-2013-0078028 A | 7/2013 |

(Continued)

*Primary Examiner* — M'Baye Diao
(74) *Attorney, Agent, or Firm* — Mintz Levin Cohn Ferris Glovsky and Popeo, P.C.; Peter F. Corless

(57) ABSTRACT

A vehicle charger is provided that receives power from electric vehicle supply equipment to charge a battery mounted within an electric. The charger includes a charging controller that is configured to execute a charging mode of the vehicle charger and a main power supplier that is configured to supply main power to the charging controller. In addition, an auxiliary power supplier is configured to supply battery power as auxiliary power when receiving a control pilot signal generated from the electric vehicle supply equipment. A power controller is configured to detect the control pilot signal and turn the main power supply and the auxiliary power supply on and off based on state information regarding the detected control pilot signal and a charging mode control signal output from the charging controller.

20 Claims, 5 Drawing Sheets

(56) References Cited

FOREIGN PATENT DOCUMENTS

| | | |
|---|---|---|
| KR | 10-2013-0081973 A | 7/2013 |
| KR | 10-2014-0084369 A | 7/2014 |
| WO | 2009/034878 A1 | 3/2009 |

\* cited by examiner

VEHICLE CHARGER AND METHOD FOR CONTROLLING POWER THEREOF

CROSS-REFERENCE TO RELATED APPLICATION

This application is based on and claims the benefit of priority to Korean Patent Application No. 10-2014-0133276, filed on Oct. 2, 2014 in the Korean Intellectual Property Office, the disclosure of which is incorporated herein in its entirety by reference.

TECHNICAL FIELD

The present disclosure relates to a vehicle charger and a method for controlling power thereof which control a turn on/off of control power supply of a charger to charge a battery when an engine of a vehicle stalls.

BACKGROUND

When a connector of electric vehicle supply equipment (EVSE) for charging in a state in which a vehicle engine stalls is connected to a vehicle charger, a control power supply of the vehicle charger is required to be turned on. In particular, the control power supply is turned on/off by a control pilot (CP) signal presented in the SAE J1772TM (SAE Electric Vehicle and Plug in Hybrid Electric Vehicle Conductive Charge Couple) standard which is a charging standard of a battery.

Known systems in the related art implement a simple turn on/off function. However, such systems have difficulty with a configuration of additional functions or a change of standard. In particular, in the related art various operations are required to be defined to add a reserved charging function and various operation conditions are required to be defined even during the input of abnormal conditions, but have a difficulty in defining the operation conditions by the typical method.

SUMMARY

The present disclosure provides a vehicle charger and a method for controlling power thereof which adjust a control power supply of the vehicle charger based on a control pilot signal and a charging mode control input to charge a vehicle battery when a vehicle engine stalls.

According to an exemplary embodiment of the present disclosure, a vehicle charger receiving power from electric vehicle supply equipment to charge a battery mounted within an electric vehicle may include: a charging controller configured to operate a charging mode of the vehicle charger; a main power supplier configured to supply main power to the charging controller; an auxiliary power supplier configured to supply battery power as auxiliary power in response to receiving a control pilot signal generated from the electric vehicle supply equipment; and a power controller configured to detect the control pilot signal and execute a turn on/off of the main power supply and the auxiliary power supply based on state information of the detected control pilot signal and a charging mode control signal output from the charging controller.

The charging mode control signal may include a reserve mode entry signal and an off mode entry signal. The state information may include whether the control pilot signal is detected and a signal type. The signal type may include a substantially constant voltage signal and a pulse width modulation (PWM) signal.

The power controller may include: a control pilot detector configured to detect the control pilot signal and output the state information of the control pilot signal based on the signal type; and an on/off controller configured to enter a ready state when turned on by the auxiliary power supply and enter a next state based on the state information and the charging mode control signal in the ready state to output a main power control signal and an auxiliary power control signal based on the corresponding state.

The on/off controller may be configured to enable the main power supplier and the auxiliary power supplier when entering the ready state. The on/off controller may be transitioned to a reserve state when there is an input of the control pilot signal in the ready state and the on/off controller receives a reserve mode entry signal from the charging controller to disable the main power supplier. The on/off controller may be configured to maintain the reserve state when a substantially constant voltage control pilot signal is detected in the reserve state.

Further, the on/off controller may be transitioned to the ready state when the control pilot signal detected in the reserve state is a PWM signal to turn on the main power supply and the auxiliary power supply. The on/off controller may also be transitioned to an off state when the control pilot signal is not detected in the reserve state to turn off the main power supply and the auxiliary power supply. The on/off controller may be transitioned to the off state when there is no input of the control pilot signal in the ready state and the on/off controller receives an off mode entry signal from the charging controller to turn off the main power supply and the auxiliary power supply. In addition, the on/off controller may be transitioned to the off state when there is no input of the control pilot signal in the ready state and an engine is in a turn off state to turn off the main power supply and the auxiliary power supply.

According to another exemplary embodiment of the present disclosure, a method for controlling power of a vehicle charger may include: entering an on/off controller into a ready state when a power supply is turned on; receiving a charging mode control signal and state information regarding a control pilot signal in the ready state; determining a next state based on the charging mode control signal and the state information; and entering the next state to output a power control signal based on the corresponding state.

In particular, the next state may be determined as any one of a ready state, a reserve state, and an off state. In addition, when the next state is in the ready state, the on/off controller may be configured to enter the ready state to turn on a main power supply and an auxiliary power supply. When the on/off controller enters the reserve state, a main power supply may be turned off and an auxiliary power supply may be turned on. Additionally, when the on/off controller enters the off state, the main power supply and the auxiliary power supply may be turned off.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
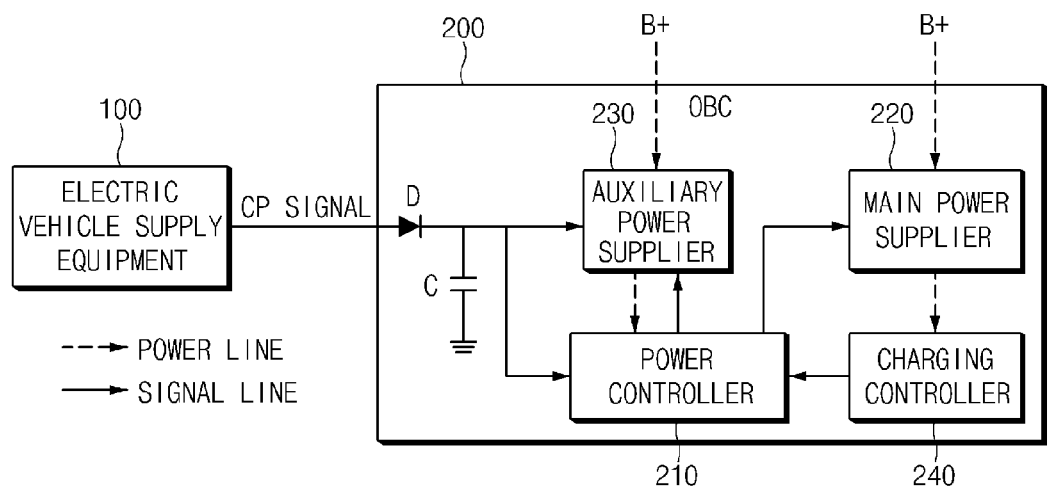
FIG. 1 is an exemplary block configuration diagram of a vehicle charging system according to an exemplary embodiment of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, exemplary embodiments of the present disclosure will be described in detail with reference to the accompanying drawings.

FIG. 1 is an exemplary block configuration diagram of a vehicle charging system according to an exemplary embodiment of the present disclosure. Retelling to FIG. 1, a vehicle charging system may include electric vehicle supply equipment 100 and a vehicle charger 200.

The electric vehicle supply equipment (EVSE) 100 may be connected to the vehicle charger 200 via a connector and may be configured to charge a battery (not illustrated) which supplies driving power of a vehicle using the vehicle charger 200. The electric vehicle supply equipment 100 may be configured to generate a control pilot (CP) signal. The control pilot signal may be generated in a form of 12V constant voltage, 9V constant voltage, 9V pulse width modulation (PWM), 6V PWM, and the like. The vehicle charger 200 may include a power controller 210, a main power supplier 220, an auxiliary power supplier 230, and a charging controller 240, as an on board charger (OBC) mounted within a vehicle.

The power controller 210 may be configured to detect the control pilot signal transmitted from the electric vehicle supply equipment 100 when an engine of an electric vehicle stalls and may be configured to adjust a supply of control power of the vehicle charger 200 to be cut off based on the detected control pilot signal. In other words, the power controller 210 may be configured to monitor the control pilot signal and adjust the control power of the vehicle charger 200 based on state information of the control pilot signal.

The power controller 210 may be implemented as programmable devices such as a complex programmable logic device (CPLD) and a field programmable gate array (FPGA). As such, the power controller 210 according to the exemplary embodiment of the present disclosure may be implemented as a software form, and thus at the time of implementing additional functions, the power controller 210 may be implemented without adding costs, thereby saving costs.

The main power supplier 220 may be configured to supply or cut off, as the control power, battery power (B+) output from a battery (e.g., high voltage battery) equipped in a vehicle to or from the charging controller 240 based on the control of the power controller 210. In response to receiving the control pilot signal generated from the electric vehicle supply equipment 100, the auxiliary power supplier 230 may be configured to supply the power (B+) supplied from the battery to the power controller 210. In other words, in response to sensing an input of the CP signal, the auxiliary power supplier 230 may be turned on to enable the power controller 210.

The charging controller 240 may be configured to operate the vehicle charger 200. In other words, the charging controller 240 may be configured to receive the control power (e.g., main power) via the main power supplier 220 to execute the charging of the battery. The charging controller 240 may be configured to generate and output the control signal based on a charging mode (e.g., reserve mode, standby mode, charging mode, and the like). Particularly, a charging mode control signal may include a reserve mode entry signal and an off mode entry signal.

Figure 2:
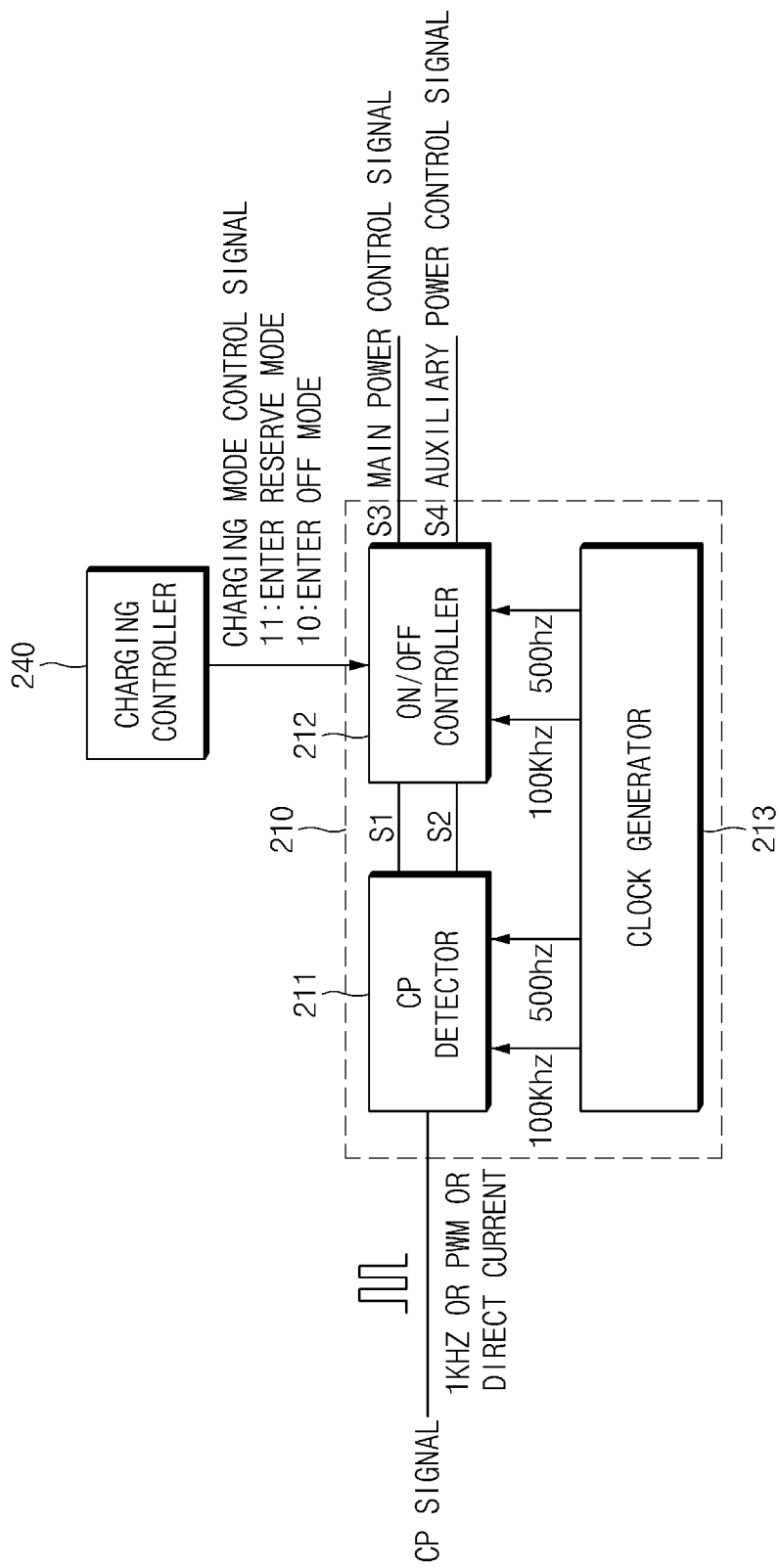
FIG. 2 is an exemplary block configuration diagram of a power controller illustrated in FIG. 1 according to an exemplary embodiment of the present disclosure.

FIG. 2 is an exemplary block configuration diagram of a power controller 210 illustrated in FIG. 1. As illustrated in FIG. 2, the power controller 210 may include a constant power (CP) detector 211, an on/off controller 212, and a clock generator 213.

The CP detector 211 may be configured to monitor the CP signal generated from the electric vehicle supply equipment 100 when the electric vehicle supply equipment 100 is connected to the vehicle charger 200 using an interface. Further, the CP detector 211 may be configured to generate and output state information regarding the detected CP signal. In particular, the state information may include information regarding whether the CP signal is detected (S1) and a signal type S2, in which the signal type may include a constant voltage (e.g., direct current (DC)) signal and a pulse width modulation (PWM) signal. Meanwhile, the state information may be signal level information of the CP signal and may include information regarding whether a high level CP signal is detected (S1) and whether a low level CP signal is detected (S2), for a set period of time.

The CP detector 211 may further be configured to confirm the signal level of the CP signal received for the set period of time (e.g., defined period of time (e.g., about 1 ms) and count the CP signal by dividing the CP signal into a high level signal and a low level signal based on the confirmed result. The CP detector 211 may be configured to confirm whether a counting number of the high level signal is within a reference range. In response to confirming that the counting number of the high level signal is within the reference range, the CP detector 211 may be configured to generate state information (S1S2="11") which represents the CP signal detection and the PWM signal. In other words, the CP detector 211 may be configured to output the state information which represents the CP signal detection of the PWM type.

Meanwhile, in response to confirming that when the counting number of the high level signal exceeds an upper bound threshold of the reference range, the CP detector 211 may be configured to generate state information (S1S2="10") which represents the CP signal detection and the constant voltage signal. In other words, the CP detector 211 may be configured to output the state information which represents the CP signal detection of the constant voltage.

Furthermore, in response to confirming that the counting number of the high level signal is less than a low bound threshold of the reference range, the CP detector 211 may be configured to determine that the CP signal is not detected to generate state information (S1S2="00" or "01") corresponding thereto. The CP detector 211 may be configured to confirm the signal level of the CP signal for the set time and count the CP signal by dividing the CP signal into the high level signal and the low level signal based on the signal level. The CP detector 211 may also be configured to confirm whether the counting number of the high level signal and the low level signal is equal to or greater than the threshold and generate and output as the state information, whether the high level CP signal and the low level CP signal are detected based on the confirmed result.

The on/off controller 212 may be configured to transmit a main power control signal and an auxiliary power control signal to the main power supplier 220 and the auxiliary power supplier 230, respectively, based on the state information of the CP signal and the charging mode control signal output from the CP detector 211 and the charging controller 240. In other words, the on/off controller 212 may be configured to execute the operation of the charging controller 240. The clock generator 213 may be configured to generate clock signals of a first frequency and a second frequency. The power controller 210 may be synchronized with a clock signal when an auxiliary power supply is turned on. Particularly, the first frequency and the second frequency may be about 100 kHz and 500 hz.

Figure 3:
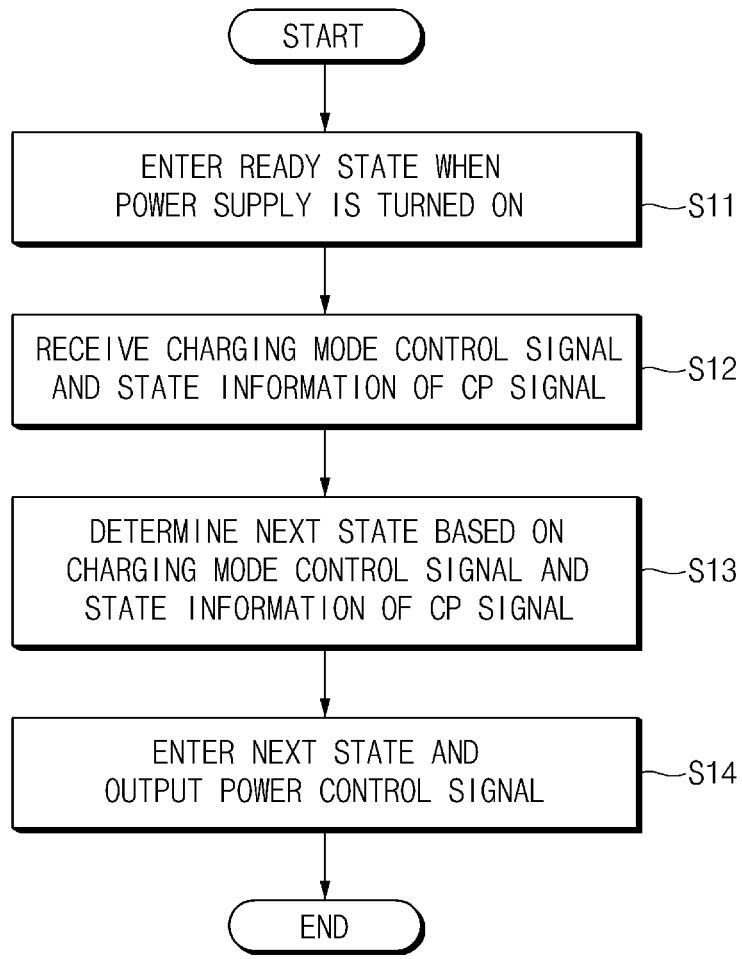
FIG. 3 is an exemplary flow chart of a method for controlling power of a vehicle charger according to an exemplary embodiment of the present disclosure.

FIG. 3 is an exemplary flow chart of a method for controlling power of a vehicle charger according to an exemplary embodiment of the present disclosure. The power controller 210 may be configured to enter a ready state when the power supply is turned on (S11). When the electric vehicle supply equipment 100 is connected to the vehicle charger 200, the electric vehicle supply equipment 100 may be configured to generate the CP signal. In response to sensing the generation of the CP signal, the auxiliary power supplier 230 of the vehicle charger 200 may be configured to supply the battery power (B+) to the power controller 210 as auxiliary power. In other words, the on/off controller 210 of the power controller 210 may be configured to enter a ready state when power is supplied by the auxiliary power supplier 230.

The on/off controller 212 of the power controller 210 may be configured to receive the state information of the CP signal output from the CP detector 211 and the charging mode control signal input from the charging controller 210 in the ready state (S12). In particular, the state information of the CP signal may include whether the CP signal is input and the type (e.g., constant voltage signal or PWM signal) of the CP signal and the charging mode control signal may include the reserve mode entry signal and the off mode entry signal.

The on/off controller 212 may be configured to determine a next state based on the state information regarding the CP signal and the charging mode control signal (S13). In particular, the next state may be determined as any one of the group consisting of: a ready state, a reserve state, and an off state. The on/off controller 212 may further be configured to enter the determined next state to output the control signals for on/off control of the main power supply and the auxiliary power supply, respectively, based on the corresponding state (S14). In other words, the on/off controller 212 may be configured to generate and output a main power control signal S3 and an auxiliary power control signal S4, respectively. The main power supplier 220 and the auxiliary power supplier 230 may be configured to turn on the corresponding power supply when the control signal is an enable signal and turn off the corresponding power supply when the control signal is a disable signal.

Figure 4:
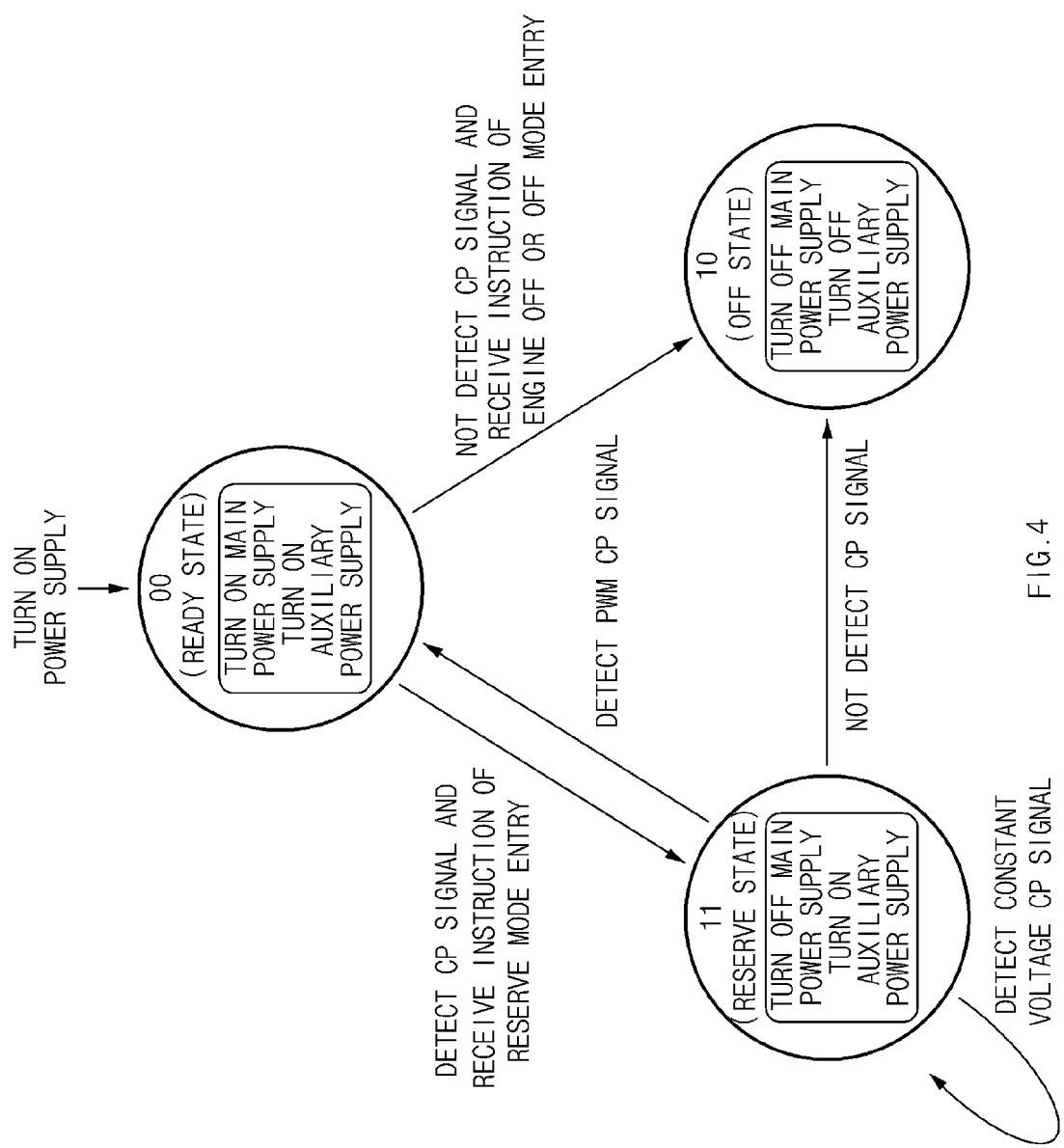
FIG. 4 is an exemplary state transition diagram of an on/off controller according to an exemplary embodiment of the present disclosure.

FIG. 4 is an exemplary state transition diagram of the on/off controller according to an exemplary embodiment of the present disclosure. When the power supply is turned on, the on/off controller 212 may be configured to enter the ready state (S21). Further, the on/off controller 212 may be configured to output the control signal for enabling the main power supplier 220 and the auxiliary power supplier 230. In other words, the on/off controller 212 may be configured to generate and output a main power control signal "1" and an auxiliary power control signal "1." The charging controller 240 may be configured to determine whether the on/off controller 212 enters the reserve mode.

Further, the on/off controller 212 may be configured to determine the next state as the reserve state when the input of the CP signal is in the ready state. Additionally, the on/off controller 212 may be transitioned from the ready state to the reserve state to turn off the main power supply and maintain the auxiliary power supply in a turn on state. Particularly, the on/off controller 212 may be configured to continuously maintain the reserve state when the detected CP signal is the constant voltage signal.

Moreover, the on/off controller 212 may be configured to determine the next state as the ready state when the CP signal detected in the reserve state is the PWM signal to be transitioned from the reserve state to the ready state. The on/off controller 212 may be configured to enter the ready state to turn on the main power supply and the auxiliary power supply. In addition, the on/off controller 212 may be configured to determine the next state as the off state when the CP signal is not detected in the reserve state and thus may be configured to enter the off state. When entering the off state, the on/off controller 212 may be configured to turn off both of the main power supply and the auxiliary power supply.

The on/off controller 212 may be configured to detect the CP signal in the ready state and may be transitioned to the off state when the charging mode control signal is the off mode entry signal to turn off both of the main power supply and the auxiliary power supply. Further, the on/off controller 212 may be configured to turn off both of the main power supply and the auxiliary power supply when there is no input of the CP signal in the ready state and the engine of the vehicle is in an off state (e.g.: IG 3="0").

Figure 5:
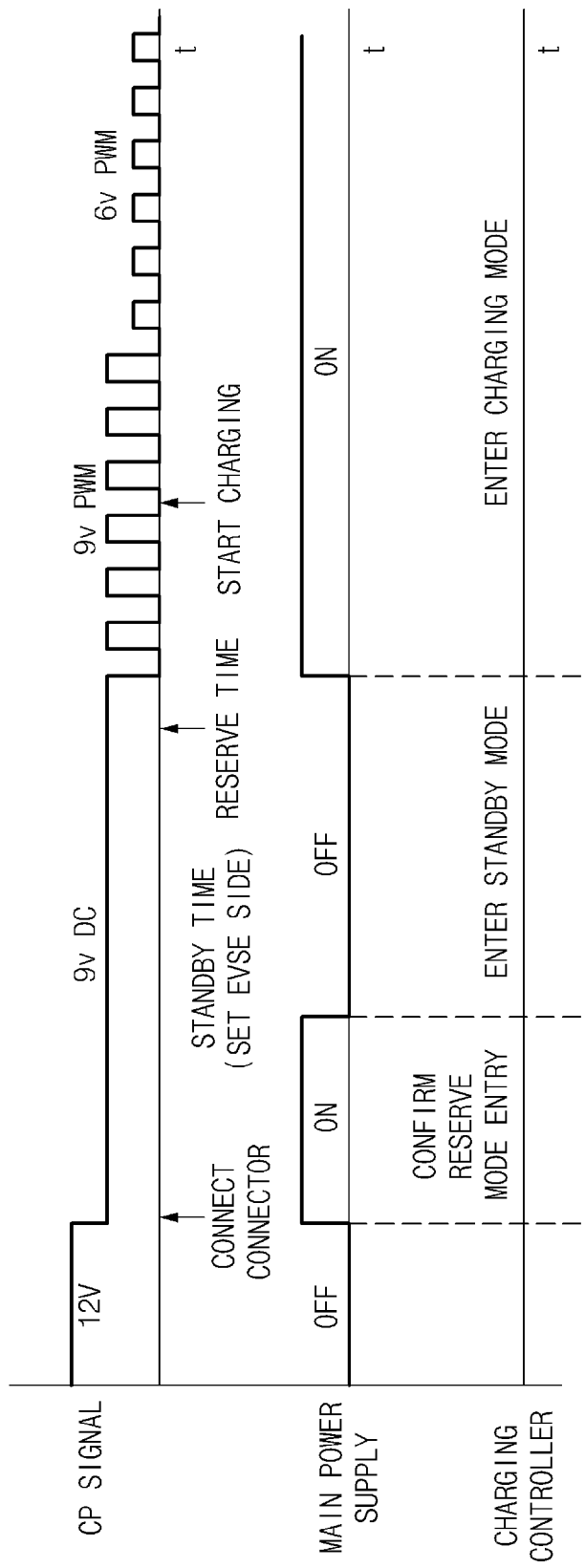
FIG. 5 is an exemplary diagram illustrating a power control of the charger during reserved charging according to the exemplary embodiment of the present disclosure.

FIG. 5 is an exemplified diagram illustrating the power control of the charger during reserved charging according to the exemplary embodiment of the present disclosure. First, when the electric vehicle supply equipment 100 is connected to the vehicle charger 200, the auxiliary power supplier 230 of the vehicle charger 200 may be configured to sense the connection to supply power to the power controller 210. In response to detecting the CP signal of the constant voltage (e.g.: about 12V DC) using the CP detector 211, the on/off controller 212 of the power controller 210 may be configured to operate the main power supplier 220 to supply main power to the charging controller 240. In particular, the charging controller 240 may be configured to determine whether it enters the reserve mode while the main power (e.g., control power) is supplied. Further, the charging controller 240 may be configured to enter the reserve mode when the CP signal of the constant voltage is input for a predetermined time or greater and then waits.

In response to detecting the CP signal and receiving the reserve mode entry signal from the charging controller 240, the on/off controller 212 may be configured to enter the reserve state to turn off the main power supply. In response to detecting the CP signal of the PWM type using the CP detector 211, the on/off controller 212 may be transitioned from the reserve state to the ready state to turn on the main power supply and the auxiliary power supply. In particular, the charging controller 240 may be configured to enter the charging mode.

As described above, according to the exemplary embodiments of the present disclosure, it may be possible to adjust the control power supply of the vehicle charger based on the control pilot signal and the charging mode control input to charge the battery when the vehicle engine stalls.

What is claimed is:

1. A vehicle charger receiving power from electric vehicle supply equipment to charge a battery mounted within a vehicle, comprising:
  a charging controller configured to operate a charging mode of the vehicle charger;
  a main power supplier configured to supply main power to the charging controller, wherein the main power is battery power output from the battery;
  an auxiliary power supplier configured to supply the battery power as auxiliary power in response to receiving a control pilot signal generated from the electric vehicle supply equipment; and
  a power controller configured to detect the control pilot signal when an engine of the electric vehicle stalls and turn the main power supply and the auxiliary power supply on and off based on state information regarding the detected control pilot signal and a charging mode control signal output from the charging controller,
  wherein the auxillary power supplier supplies the battery power to the power controller in response to detecting the control pilot signal.

2. The vehicle charger according to claim 1, wherein the charging mode control signal includes a reserve mode entry signal and an off mode entry signal.

3. The vehicle charger according to claim 1, wherein the state information includes whether the control pilot signal is detected and a signal type.

4. The vehicle charger according to claim 3, wherein the signal type includes a constant voltage signal and a pulse width modulation (PWM) signal.

5. The vehicle charger according to claim 1, wherein the power controller includes:
  a control pilot detector configured to detect the control pilot signal and output the state information regarding the control pilot signal based on a signal type; and
  an on/off controller configured to enter a ready state when turned on by the auxiliary power supply and enter a next state based on the state information and the charging mode control signal in the ready state to output a main power control signal and an auxiliary power control signal based on the corresponding state.

6. The vehicle charger according to claim 5, wherein the on/off controller is configured to enable the main power supplier and the auxiliary power supplier when entering the ready state.

7. The vehicle charger according to claim 6, wherein the on/off controller is transitioned to a reserve state when an input of the control pilot signal is in the ready state and the on/off controller receives a reserve mode entry signal from the charging controller to disable the main power supplier.

8. The vehicle charger according to claim 7, wherein the on/off controller is configured to maintain the reserve state when a constant voltage control pilot signal is detected in the reserve state.

9. The vehicle charger according to claim 7, wherein the on/off controller is transitioned to the ready state when the control pilot signal detected in the reserve state is a pulse width modulation (PWM) signal to turn on the main power supply and the auxiliary power supply.

10. The vehicle charger according to claim 7, wherein the on/off controller is transitioned to an off state when the control pilot signal is not detected in the reserve state to turn off the main power supply and the auxiliary power supply.

11. The vehicle charger according to claim 7, wherein the on/off controller is transitioned to an off state when there is no input of the control pilot signal in the ready state and the on/off controller receives an off mode entry signal from the charging controller to turn off the main power supply and the auxiliary power supply.

12. The vehicle charger according to claim 7, wherein the on/off controller is transitioned to the off state when there is no input of the control pilot signal in the ready state and an engine is in a turn off state to turn off the main power supply and the auxiliary power supply.

13. A method for controlling power of a vehicle charger, comprising:

entering, by a power controller, a ready state when an auxiliary power supplier supplies battery power to the power controller in response to sensing a control pilot signal generated from electric vehicle supply equipment;

receiving, by the power controller, a charging mode control signal and state information regarding a control pilot signal in the ready state;

determining, by the power controller, a next state based on the charging mode control signal and the state information; and entering, by the power controller, the next state to output a power control signal based on the corresponding state, wherein the power controller detects the control pilot signal when an engine of the electric vehicle stalls.

14. The method according to claim 13, wherein the next state is determined as any one selected from the group consisting of: the ready state, a reserve state, and an off state.

15. The method according to claim 14, further comprising:

when the next state is the ready state, entering, by the power controller, the ready state to turn on a main power supply and an auxiliary power supply.

16. The method according to claim 14, wherein in the outputting of the power control signal, when the power controller enters the reserve state, a main power supply is turned off and an auxiliary power supply is turned on.

17. The method according to claim 14, wherein in the outputting of the power control signal, when the power controller enters the off state, a main power supply and an auxiliary power supply are turned off.

18. A non-transitory computer readable medium containing program instructions executed by a power controller, the computer readable medium comprising:

program instructions that enter a ready state when an auxillary power supplier supplies battery power to the power controller in response to sensing a control pilot signal generated from electric vehicle supply equipment;

program instructions that receive a charging mode control signal and state information regarding a control pilot signal in the ready state;

program instructions that determine a next state based on the charging mode control signal and the state information; and program instructions that enter the next state to output a power control signal based on the corresponding state, wherein the power controller detects the control pilot signal when an engine of the electric vehicle stalls.

19. The non-transitory computer readable medium of claim 18, wherein in the determining of the next state, the next state is determined as any one selected from the group consisting of: the ready state, a reserve state, and an off state.

20. The non-transitory computer readable medium of claim 19, further comprising:

program instructions that enter the ready state to turn on a main power supply and an auxiliary power supply when the next state is the ready state.

* * * * *